United States Patent Office 3,592,890
Patented July 13, 1971

3,592,890
METHOD OF COMBATING ATROPHIC RHINITIS
Marian Janiak, Basel, Switzerland, assignor to Ciba Limited, Basel, Switzerland
No Drawing. Continuation-in-part of abandoned application Ser. No. 550,640, May 17, 1966. This application Jan. 13, 1970, Ser. No. 2,654
Claims priority, application Switzerland, June 4, 1965, 7,878/65
Int. Cl. A61k 27/00
U.S. Cl. 424—229
8 Claims

ABSTRACT OF THE DISCLOSURE

A prophylactic veterinary method of combating atrophic rhinitis which comprises parenterally or enteral administering to an animal e.g. during the second week of life, an effective amount of 5-(para-aminobenzenesulfonamido)-1-phenyl-3-methyl-pyrazole, said compound being in the form of a salt.

CROSS REFERENCE

This application is a continuation-in-part of application Ser. No. 550,640, filed May 17, 1966 and now abandoned.

This invention relates to a veterinary method of prophylactically combating atrophic rhinitis.

Atrophic rhinitis (rhinitis atrophicans) occurs mainly in pigs. It is caused by *Bordetella bronchiseptica, Haemophilus suis*, and a still unknown virus. Its occurrence in hogsties entails considerable financial loss. The term pig used hereinafter embraces suckling and weaned pigs and piglets is intended to mean suckling pigs.

It has now been found that 5-(para-aminobenzenesulfonamido)-1-phenyl-3-methyl-pyrazole, in the free form or in the form of a salt, is particularly well suited as an agent for combating said disease.

The process of this invention consists in administering to an animal having atrophic rhinitis 5-(para-aminobenzene-sulfonamido)-1-phenyl - 3 - methyl-pyrazole or salt thereof. Best results were obtained when the treatment was carried out prophylactically by parenteral administration on three consecutive days i.e. on the 10th, 11th and 12th day of life.

Suitable salts are primarily salts with bases, above all with physiologically tolerable bases, such as salts with metals, especially with alkali metals, alkaline earth metals or earth metals, for example, the sodium, potassium, calcium, magnesium or aluminium salt. Especially suitable is the sodium salt or the potassium salt or a mixture of the two. It is of advantage to use a mixture consisting of 2 parts of the potassium salt and 1 part of the sodium salt because such mixture forms stable aqueous solutions at concentrations up to 20%. Such stable aqueous solutions are especially suitable for parenteral administration.

The compound is preferably administered in the form of a veterinary preparation containing the free 5-(para-amino - benzene-sulfonamido)-1-phenyl-3-methyl-pyrazole or a salt thereof in admixture with an organic or inorganic, solid or liquid pharmaceutical excipient suitable for enteral or parenteral administration. Suitable excipients are substances that do not react with the active compound, for example water, gelatine, lactose, starches colloidal silicic acid, magnesium stearate, talc, vegetable oils, benzyl alcohols, gums, polyalkylene glycols, white petroleum jelly and other known medicinal excipients. The veterinary preparations may be, for example, tablets, dragees, powders, suppositories, or in liquid form solutions, suspensions or emulsions. They may be sterilized and/or may contain assistants, such as preserving, stabilizing, wetting or emulsifying agents, salts for regulating the osmotic pressure or buffers. They may also contain other therapeutically valuable substances. The preparations are formulated in the usual manner.

Alternatively, the active substance may be admixed with the animal fodder or the drinking water and given to the animal in this way.

In combating atrophic rhinitis, a daily dose of preferably 40-150 mg. per kg. of bodyweight is administered. For parenteral, for example intramuscular or subcutaneous, administration which is especially suitable for piglets a daily dose of 40-100 mg./kg., especially 60 mg./kg., and for enteral, for example, oral, administration, a daily dose of 40-150 mg./kg., especially 70 mg./kg., is used.

5 - (para-aminobenzenesulfonamido)-1-phenyl-3-methylpyrazole is known.

The following examples illustrate the invention:

EXAMPLE 1

On a farm where atrophic rhinitis prevails all piglets older than 12 days and all grown-up pigs (store pigs, sows, boars) are given daily, intramuscular doses of 0.3 ml./kg. of a 20% solution of the following composition on three consecutive days:

| | Mg. |
|---|---|
| 5-(para - aminobenzenesulfonamido) - 1 - phenyl-3-methyl - pyrazole | 200 |
| Sodium hydroxide (100%) | 8.5 |
| Potassium hydroxide (100%) | 22.3 |
| Benzyl alcohol | 16.0 |
| Distilled water to make up 1 ml. | |

All piglets born after that treatment are given on their 10th, 11th, and 12th day of life 1 ml. of the above injection solution subcutaneously. The symptoms disappear within three days of the treatment and any existing pathologic changes in the anatomy of the head or snout are checked.

EXAMPLE 2

On a farm where atrophic rhinis prevails, all pigs are given allmesh pig fodder with which 70 mg. per kg. of body weight of 5 - (para-aminobenzenesulfonamido)-1-phenyl-3-methyl-pyrazole per daily ration have been admixed. This so-called medicinal fodder is administered for three days. If necessary, this treatment is repeated every three months.

EXAMPLE 3

On a farm where atrophic rhinitis occurs, the quantity of drinking water consumed per day and pig is determined. It depends on the temperature, the humidity of the air, and on how closely the animals live together. 60 mg. of 5-(para-aminobenzenesulfonamido) - 1 - phenyl-3-methyl-pyrazole per kg. of body weight are then admixed with the water in the form of a 2.1 mixture of the potassium and sodium salts, together with a sweetening agent to cover up the bitter taste of the compound, and the water then given to the animals. During the treatment period of three days, no other water must be given to the animals.

I claim:

1. A veterinary method of combating atrophic rhinitis which consists in parenterally administering to a pig during the second week of life in an amount of 40–150 mg. per kg. of 5-(para-amino-benzenesulfonamido)-1-phenyl-3-methyl-pyrazole, said compound being in the form of a member selected from the group consisting of an alkali metal, an alkaline earth metal and an earth metal salt thereof.

2. A method as claimed in claim 1, wherein the 5-(para-amino-benzenesulfonamido) - 1 - phenyl-3-methyl-pyrazole is administered parenterally in the form of an alkali metal salt.

3. A method according to claim 2, wherein the alkali metal salts consists of a mixture of 2 parts of the sodium and 1 part of the potassium salt.

4. A method as claimed in claim 1, wherein 40–100 mg. of the active compound per kg. of bodyweight are administered parenterally.

5. A method as claimed in claim 1, wherein about 60 mg. of the active compound per kg. of bodyweight are administered parenterally.

6. A method as claimed in claim 4, wherein the active compound is administered in admixture with a pharmaceutical carrier suitable for parenteral administration.

7. A method as claimed in claim 5, wherein the active compound is administered in admixture with a pharmaceutical carrier suitable for parenteral administration.

8. A method as claimed in claim 1 wherein the prophylactic treatment is carried out parenterally on the 10th, 11th and 12th day of life.

References Cited
UNITED STATES PATENTS

| | | | |
|---|---|---|---|
| 3,028,382 | 4/1962 | Achelis et al. | 424—229 |
| 3,053,833 | 10/1962 | Nakagome et al. | 424—229 |
| 3,336,190 | 8/1967 | Switzer | 424—229 |

Veterinary Bulletin, vol. 30, 1960, para. 829, p. 109.
Veterinary Bulletin, vol. 34, 1964, para. 675, pp. 144–145.
Chemical Abstracts, vol. 55, 1961, p. 4642(c).

JEROME D. GOLDBERG, Primary Examiner